United States Patent [19]

Yanagiuchi et al.

[11] Patent Number: 4,488,195
[45] Date of Patent: Dec. 11, 1984

[54] MAGNETIC HEAD AND METHOD OF PRODUCING SAME

[75] Inventors: Yukihiro Yanagiuchi, Katano; Eiichi Hirota; Hiroshi Sakakima, both of Hirakata; Harufumi Senno, Yamatokoriyama, all of Japan

[73] Assignee: Matsushita Electric Industrial Co., Ltd., Kadoma, Japan

[21] Appl. No.: 358,208

[22] Filed: Mar. 15, 1982

[30] Foreign Application Priority Data

Mar. 20, 1981 [JP] Japan .................. 56-40977

[51] Int. Cl.³ .................. G11B 5/12; G11B 5/16; G11B 5/251; H01F 1/04
[52] U.S. Cl. .................. 360/125; 148/112; 360/120; 360/126
[58] Field of Search .......... 360/125, 126, 127, 112, 360/120, 122, 119; 148/112, 403

[56] References Cited

U.S. PATENT DOCUMENTS

| | | | |
|---|---|---|---|
| Re. 29,326 | 7/1977 | Lazzari | 360/120 |
| 3,781,486 | 12/1973 | Maryatt | 360/120 |
| 4,179,719 | 12/1979 | Imamura | 360/112 |
| 4,217,613 | 8/1980 | Schwartz | 360/125 |
| 4,257,830 | 3/1981 | Tsuya | 148/112 |
| 4,321,641 | 3/1982 | Lee | 360/126 |
| 4,411,716 | 10/1983 | Shiiki | 148/403 |

Primary Examiner—Robert Martin Kilgore
Attorney, Agent, or Firm—Stevens, Davis, Miller & Mosher

[57] ABSTRACT

A magnetic head and a method of producing same, wherein the magnetic head includes a head core formed of metallic magnetic material and has a head gap formed in a portion of the head core adapted to be positioned against a recording medium, and windings mounted on the head core. The material forming the head core is amorphous and has the following composition:

$(Co_{1-x}M'_x)_a Zr_b Si_c B_d$, where M' is at least one element selected from the group consisting of Cr, Mn, Fe Ni, Nb, Mo, W and Ti, $0.03 \leq x \leq 0.15$, $3 \leq b \leq 25$, $0 \leq c \leq 20$, $0 \leq d \leq 5$, and $a+b+c+d=100$.

8 Claims, 3 Drawing Figures

MAGNETIC HEAD AND METHOD OF PRODUCING SAME

BACKGROUND OF THE INVENTION

This invention relates to a magnetic head formed of metallic magnetic material adapted to be brought into contact with a magnetic recording medium to record and reproduce signals on and from the recording medium, and a method of producing same.

In a contact type magnetic head, what is most important in achieving improved performance in practical use is to minimize wear caused on the head core by the sliding contact with the recording medium, particularly wear caused on the head gap portion that performs the operation of recording and reproducing the signals. Wear caused on the head core, particularly the head gap portion, causes changes to occur in the properties of the magnetic head due to its deformation caused by the wear, thereby usually causing marked deterioration in performance.

In recent years, there has been a tendency to use, in producing magnetic recording mediums, magnetic material of high coercive force (Hc) for the purpose of improving the recording density. For example, what is generally referred to as a metal tape having a coat of Fe or Fe-Co alloy powder applied to the base has a very high coercive force or Hc=1000-2000 Oe. Magnetic heads used for recording and reproducing the signals on and from such recording medium include a head having a head core formed of ferrite having high wear resistance. However, owing to the fact that the saturation magnetic flux density of ferrite $Bs=4\pi Is$ (where Is is the value of saturation magnetization) is not high enough, ferrite has had the disadvantage that the head core undergoes magnetic saturation and causes distortion of the recorded signals or makes it impossible to give sufficiently high residual magnetization to the medium to make satisfactory recordings. More recently, the attention of the electronic industries has been attracted to magnetic metal material of high saturation magnetic flux density, such as Fe-Si-Al alloys or amorphous alloys obtained by super-rapid quenching of molten 3d transition metal alloys containing substantially 20% of vitrifying elements such as P, C, B, Zr, etc., because of their high hardness. In magnetic heads including head cores formed of such metallic magnetic material, the head cores generally used are formed as follows. When the thickness d of the head core is sufficiently greater than the depth of the surface layer of the core material $ds=5040\sqrt{\rho|\mu f}$ (cm) where f is the frequency (Hz) of the signal to be recorded, $\mu$ is the permeability of the head core material and $\rho(\Omega\text{-cm})$ is the electrical resistivity, or when $d>>2$ ds, thin sheets of magnetic metal each of which having thickness substantially equal to 2 ds and having been worked to have a predetermined core shape are stacked and bonded together by resinous adhesives to fabricate a core of the predetermined thickness d. Sendust is a material which is difficult to be processed to such thin sheet. On the other hand, amorphous alloys obtained by super-rapid quenching can readily be formed into a strip of about 50 $\mu$m in thickness, so that many studies on using them as head core material suitable for recording medium of high coercive force (Hc) have been carried out. However, amorphous alloys obtained by super-rapid quenching are not without disadvantages. One of such disadvantages is that, in spite of the fact that such amorphous alloy has Vickers hardness Hv=500-1000 which is extremely high as a metallic material, when it is used as a magnetic head it shows wear of the same degree as or sometimes higher than that of sendust which has Vickers hardness Hv=500.

SUMMARY OF THE INVENTION

Accordingly this invention has been developed for the purpose of obviating the aforesaid disadvantages of the prior art.

A general object of the invention is to provide a magnetic head of high wear resistance by using magnetic metallic material of high saturation magnetic flux density suitable for a recording medium of high coercive force.

A specific object of the invention is to provide a novel magnetic head and a method of producing same, in which the head core is formed of amorphous metal material to increase its wear resistance to a level higher than that of a head core formed of Fe-Si-Al alloy.

The outstanding characteristic of the invention is that the head material has a composition $(Co_{1-x}M'_x)_aZr_bSi_cB_d$, where M' is at least one element selected from the group consisting of Cr, Mn, Fe, Ni, Nb, Mo, W and Ti, $0.03 \leq x \leq 0.15$, $3 \leq b \leq 25$, $0 \leq c \leq 20$, $0 \leq d \leq 5$, and $a+b+c+d=100$.

DESCRIPTION OF THE PREFERRED EMBODIMENTS

Figure 1:
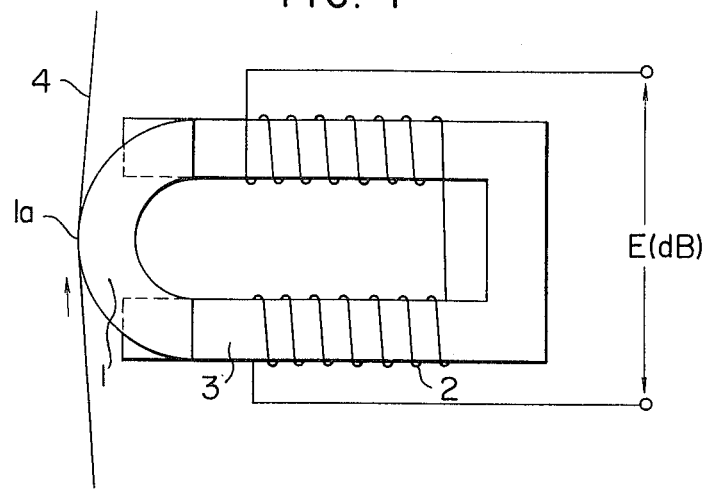
FIG. 1 is a schematic view of a model testing apparatus using a model magnetic head.

We have found that head cores having high wear resistance property as described hereinabove can be produced only when metal material of specific composition is used among the various amorphous alloys exhibiting soft magnetism. The magnetic head according to the invention comprises a head core adapted to contact a recording medium which is essentially formed of metal material, the head core being formed with a head gap in a portion thereof which contacts the recording medium and provided with a coil. Such metal material is characterized by being essentially amorphous and having high wear resistance, and has the following composition:

$(Co_{1-x}M'_x)_aZr_bSi_cB_d$, where M' is at least one element selected from the group consisting of Cr, Mn, Fe, Ni, Nb, Mo, W and Ti, $0.03 \leq x \leq 0.15$, $3 \leq b \leq 25$, $0 \leq c \leq 20$, $0 \leq d \leq 5$, and $a+b+c+d=100$.

The amorphous material for producing the head core according to the invention is basically a Co-Zr alloy material. Since the head core material is required to have high permeability, an amorphous material of low magnetostriction constaining Co as a fundamental element has attracted attention. It has been found that an amorphous alloy containing Zr as a vitrifying element is superior to other alloys from the point of view of increasing wear resistance. Particularly, it has been found that the amorphous material for forming the head core should contain 3-25 atomic % Zr to enable the head core to have higher wear resistance than a head core formed of Fe-Si-Al alloy and to have such high permeability and magnetic flux density as are required of a metal head core. When the amount of the vitrifying element is below 3 atomic %, the obtained alloy becomes brittle and the head core formed of such alloy is liable to suffer damage. On the other hand, when the amount is above 25 atomic %, magnetic flux density drops and the advantage of the use of metal material from the view point of magnetic properties is lost. More specifically, amorphous alloys containing Co as a fundamental element, such as Co-P alloy, Co-C alloy and Co-P-C alloy have been known. Such alloys have, however, the disadvantage that when they are used for producing head cores, they show wear twice as quickly as the head core formed of the amorphous alloys of the composition according to the invention, although there is substantially no difference between them in hardness.

In order to improve high permeability property and stability necessary for use for producing magnetic head cores, the amorphous alloy material of high wear resistance according to the invention has a certain proportion or 3-15% of Co replaced with one or more than two elements selected from the group consisting of Cr, Mn, Fe, Ni, Nb, Mo, W and Ti. This replacement enables the stability of the high permeability property of the amorphous alloy material according to the invention or the stability thereof with respect to application of external stress, changes with time and changes in ambient temperature to be improved. When the amount of Co replaced is below 3% or above 15%, no sufficiently high permeability property can be obtained. When Si is added in an amount that does not exceed 20% of the total amount of the alloy, the thin strip of the alloy has its hardness increased as compared with that of alloys containing no Si. On the other hand, when Si is added in an amount that exceeds 20%, the thin strip of the alloy becomes too brittle and, besides, the saturation magnetization of the thin strip is reduced.

When B is added, it becomes possible to produce the alloy without difficulty, but when B is added in an amount that exceeds 5%, the wear resistance of the alloy is deteriorated.

Another feature of the amorphous alloy material according to the invention suitable for producing head cores is that by selecting a suitable value for x of the aforesaid composition, it is possible to reduce the magnetostriction constant $\lambda_s$ to a value below $1 \times 10^{-6}$. When the alloys have a low magnetostriction, the permeability property thereof is not spoiled even if subjected to stress when formed into head cores. Particularly, it has been found that the magnetic head using low magnetostriction alloy material for producing its head core according to the invention has its output of head noise reduced by over 3 dB as compared with magnetic heads having their head cores formed of alloys of $\lambda_s < 1 \times 10^{-6}$, such as Fe-Si-Al alloy or Fe-Ni alloy, when the head core is brought into contact with a recording medium during operation.

According to the invention, the magnetic head is produced as follows. Thin sheets of a predetermined core shape are prepared by blanking or chemical etching from a strip of thin sheet of amorphous alloy of the aforesaid composition for producing head cores. They are bonded together in predetermined number by using a resin to produce a core laminate, and two core laminates are assembled with a shim of a predetermined thickness being interposed therebetween in such a manner that a magnetic head gap of a predetermined length can be formed. The head core produced in this way has a coil mounted thereon, so that the magnetic head can be fabricated. According to the invention, when core laminates are produced by bonding the thin sheets of core shapes together, minute, lamellar particles having high hardness are added to the resin used as an adhesive in a range of 10-70 weight %. By using such adhesive agent, the magnetic head has its wear resistance improved by over three times as compared with magnetic heads having their head cores produced by using core laminates incorporating no adhesive agent containing the aforesaid minute, lamellar particles having high hardness. Stated differently, the use of such minute, lamellar particles added to the adhesive delays the progress of wear to a level below 1/3 the usual value.

It has been usual practice to incorporate minute particles of high hardness of an oxide, for example, in the adhesive agent when it is desired to improve the wear resistance of head cores formed by laminating thin sheets of metal. In the magnetic head according to the invention, the magnetic alloy used has a thickness of about 50 μm. Owing to this very small thickness of the alloy used, the magnetic alloy rate of the core of laminated sheets (the voluem ratio of the magnetic alloy to the core in the core of laminated sheets) is markedly reduced if gaps are formed when the thin sheets are laminated, thereby reducing the essential magnetic flux density of the head core. The core of laminated sheets preferably has a magnetic alloy rate of over 90%. To obtain such magnetic alloy rate, it is necessary that when the thin sheets are laminated, the gap formed be below 3 μm, preferably below 1 μm. Various kinds of minute particles of high hardness have been experimented on in the step of laminating thin sheets together to obtain a head core. In light of desired wear resistance, it has been found that necessary magnetic alloy rate can be obtained by adding lamellar $\alpha$-$Fe_2O_3$, $Al_2O_3$, $CrO_2$ and $BN$ as minute particles of high hardness in the aforesaid range to the resin to provide an adhesive agent for bonding thin sheets of magnetic metal together to form a head core. The aforesaid minute particles can be obtained as minute, lamellar particles having a lamina ratio (the ratio of the square root of the area of a lamina to its thickness) of below 5-10 and a thickness of below 0.5-0.1 μm. This would appear to account for the satisfactory result obtained.

In the method according to the invention, the thin sheets are laminated together by keeping them at an arbitrarily selected temperature from the range between 100° and 250° C. in the laminating step. When held at this temperature range, amorphous alloys usually develop a reduction in permeability due to inductive magnetic anisotropy and this is not desirable. It has been found that to avoid a reduction in permeability, it is effective to apply a magnetic field from outside during laminating operation or to subject the core of laminated sheets to heat treatment after lamination is achieved. This treatment is effected by applying a magnetic field of high intensity that would cause magnetic saturation to the core of laminated sheets essentially in the direction of its thickness from outside. It has also been found that by holding a core of laminated sheets, that has been subjected to the aforesaid magnetic field treatment, in a rotary magnetic field of enough intensity to cause magnetic saturation in the surface of the core at a temperature equal to or higher than the temperature at which lamination has been carried out, it is possible to produce a magnetic head core of high permeability.

As described hereinabove, deformation of the magnetic head gap due to wear causes degeneration in the properties of the magnetic head to occur. To avoid deformation of the gap that would be caused by sliding contact with a recording medium, it is important that a suitable shim inserted into the gap be used. Usually Ti and Be-Cu alloy in foil form are used to provide a shim for metal heads. When a shim formed of the aforesaid material of the prior art is used in the magnetic head according to the invention, the head gap suffers deformation as a result of wear and has its length increased, thereby causing the frequency property of the head to be reduced. Various types of material have been examined to obtain a shim of suitable properties. As a result, it has been found that when a layer of small thickness of nonmagnetic metal or oxide is formed by sputtering on each of opposite surfaces of portions of a head core defining a magnetic gap therebetween in such a manner that the gap has a predetermined thickness, no deformation of the magnetic gap is caused due to wear resulting from sliding contact with a recording medium by virtue of the presence of a shim of the aforesaid type. Oxides, such as $SiO_2$ and glass, or an alloy having a composition $(Ni_{80}Cr_{20})_{78}Si_{10}B_{12}$, for example, have been found to be suitable for providing the aforesaid nonmagnetic amorphous shim material. The composition of glass and the aforesaid alloy has almost no influence on the properties as a shim. The magnetic head having its shim provided by sputtering has higher resistance to deformation of the magnetic gap due to wear than magnetic heads having their magnetic gaps formed by vacuum evaporation of shim material or by insertion of foil. Also, Ti or Be-Cu is not suitable as shim material even if applied by sputtering.

Embodiments of the invention will now be described in detail.

EXAMPLE 1

Amorphous ribbon of the composition shown in Table 1 was prepared by using the usual super-rapid quenching thin strip forming technique generally known as a single roll process. The ribbon had a width of 5 mm and a thickness of $50\pm2$ μm.

A model magnetic head of a 3 mm square was formed of this ribbon, and wear tests were conducted thereon by using a tape having $\gamma\text{-}Fe_2O_3$ applied thereto under conditions including 5 m/sec of relative speed between the magnetic tape and head, a temperature of 60° C. and a relative humidity of 90%. The pressure of contact between the head and magnetic tape was kept constant. The speed of wear was determined on the basis of abrasion loss caused in tape running tests lasting for 100 hours. The results obtained are shown in Table 1.

Tests were also conducted on other types of head material, such as amorphous alloys not included in the scope of the invention and Fe-Ni and Fe-Al-Si alloys that had hitherto been used as head material in the prior art, under the same conditions. The results of tests are also shown in Table 1.

Table 1 shows the values of Vickers hardness for all the specimens. It will be seen in the table that there is no correlation between the abrasion loss and hardness. It will also be seen that the alloys according to the invention have higher wear resistance than Fe-Al-Si alloys of the prior art and are superior to other amorphous alloys.

TABLE 1

| Specimen No. | Composition | Hardness (Hv) | Abrasion Loss (μm) |
|---|---|---|---|
| Amorphous Alloys of the Invention | | | |
| 1 | $Co_{79}Cr_{10.6}Zr_{10.4}$ | 600 | 10 |
| 2 | $Co_{81.5}Mo_{9.5}Zr_{9.0}$ | 600 | 10 |
| 3 | $Co_{83.5}W_{6.0}Zr_{10.5}$ | 600 | 10 |
| 4 | $Co_{84}Ti_{12}Zr_4$ | 700 | 10 |
| 5 | $Co_{86}Nb_{10}Zr_4$ | 700 | 10 |
| 6 | $Co_{80}Mn_{10}Zr_{10}$ | 600 | 12 |
| 7 | $Co_{80}Ni_{10}Zr_{10}$ | 500 | 15 |
| 8 | $Co_{80}Fe_2Nb_6Zr_8B_4$ | 900 | 10 |
| 9 | $Co_{80}Mo_7Zr_7Si_3B_3$ | 700 | 12 |
| 10 | $Co_{80}Mo_7Zr_{10}B_3$ | 650 | 14 |
| 11 | $Co_{83}Nb_{14}Zr_3$ | 800 | 12 |
| 12 | $Co_{80}Cr_7Mo_3Zr_{10}$ | 600 | 10 |
| 13 | $Co_{81}Ti_{10}Zr_9$ | 700 | 10 |
| 14 | $Co_{80}W_6Nb_{10}Zr_4$ | 800 | 11 |
| 15 | $Co_{75}Zr_{25}$ | 500 | 10 |
| 16 | $Co_{75}Zr_5Si_{20}$ | 700 | 13 |
| 17 | $Co_{85}Zr_{10}B_5$ | 700 | 14 |
| 18 | $(Co_{97}Nb_3)_{90}Zr_{10}$ | 600 | 10 |
| 19 | $(Co_{85}Ni_{15})_{90}Zr_{10}$ | 560 | 12 |
| Amorphous Alloys of the Prior Art | | | |
| 20 | $Fe_{80}P_{13}C_7$ | 900 | 30 |
| 21 | $Fe_{40}Ni_{40}B_5P_{14}$ | 700 | 50 |
| 22 | $Fe_{80}B_{20}$ | 900 | 20 |
| 23 | $Fe_{80}B_{17}C_3$ | 900 | 20 |
| 24 | $Fe_4Co_{74}P_{14}B_5Al_2$ | 900 | 40 |
| Conventional Head Material | | | |
| 25 | Fe—Al—Si Alloy | 500 | 18 |
| 26 | Fe—Ni Alloy | 120 | 200 |

EXAMPLE 2

Amorphous alloys of the composition shown in Table 2 were prepared by the same process as described by referring to example 1. The alloys had a saturation magnetostriction constant λs of below $1.0\times10^{-6}$.

TABLE 2

| Specimen No. | Composition | Magnetostriction Constant (λs) |
|---|---|---|
| Amorphous Alloys of the Invention | | |
| 1 | $Co_{79}Cr_{10.6}Zr_{10.4}$ | $<1.0\times10^{-6}$ |
| 2 | $Co_{81.5}Mo_{9.5}Zr_{9.0}$ | " |
| 3 | $Co_{83.5}W_6Zr_{10.5}$ | " |
| 27 | $Co_{81}Mo_3Zr_3B_3$ | " |
| 28 | $Co_{80}Ti_{10}Zr_6B_4$ | " |
| 29 | $Co_{79}Cr_9Zr_8B_4$ | " |
| 30 | $Co_{82}Nb_{13}Fe_1Zr_4$ | " |
| 31 | $Co_{82}Nb_{13}Mn_1Zr_4$ | " |
| 32 | $Co_{83}Ti_6Nb_8Zr_3$ | " |
| 33 | $(Co_{88}Ni_{12})_{90}Zr_{10}$ | " |
| Examples of Amorphous Alloys of High λs | | |
| 34 | $Co_{75}Si_{12}B_8$ | $-4\times10^{-6}$ |
| 35 | $(Fe_{90}Cr_{10})_{80}Si_{12}B_8$ | $9\times10^{-6}$ |
| 36 | $(Fe_{96.5}Cr_{3.5})_{80}Si_{12}B_8$ | $25\times10^{-6}$ |

Figure 2:
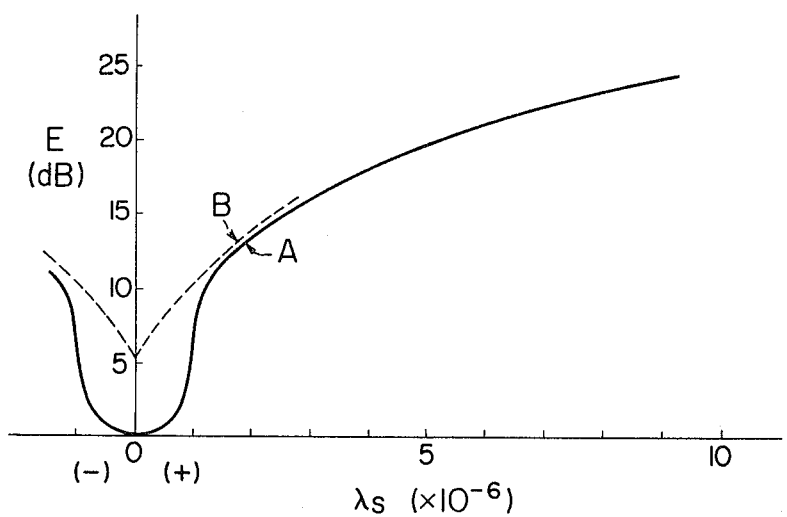
FIG. 2 is a graph showing the relation between head noise output and magnetic distortion obtained by the testing apparatus shown in FIG. 1.

The model magnetic head shown in FIG. 1 was prepared by using the alloys shown in Table 1. In FIG. 1, the numeral 1 designates a specimen of alloy for testing in the form of a semi-annulus having an outer diameter of 8 mm, an inner diameter of 4 mm and a thickness of $50\pm2$ μm. The specimen 1 has its both ends connected to a back core 3 having a winding 2 and brought into sliding engagement at its front surface 1a with an abrasive tape 4 of no magnetic coat. E designates a voltage induced to occur in the winding 2 by a fluctuation in magnetic flux caused by mechanical vibration as a result of the sliding movement of the tape with the specimen 1. FIG. 2 is a graph showing the relation between magnetostriction λs and the output of sliding head noise E, in which a solid line A represents the amorphous alloys according to the invention shown in Table 2 and the amorphous alloys of high magnetostriction shown as controls and a broken line B indicates alloys of the Fe-Al-Si system in which the composition is varied to obtain different values of λs. The output of sliding head noise E is represented by the output voltage of the winding 2 obtained when the abrasive tape 4 is running minus the output voltage of the winding 2 obtained when the abrasive tape 4 is stopped. It will be seen that the output of sliding head noise E of the head formed of amorphous alloy material is reduced as the value of λs is reduced, and that with the values of λs being equal, the head formed of amorphous alloy material is lower in the output of sliding head noise E than that formed of Fe-Al-Si alloy material. Particularly, when $\lambda s < 1 \times 10^{-6}$, the head formed of amorphous alloy material is lower by about 6 dB in the output of sliding head noise E than the head formed of conventional Fe-Al-Si alloy material.

Figure 3:
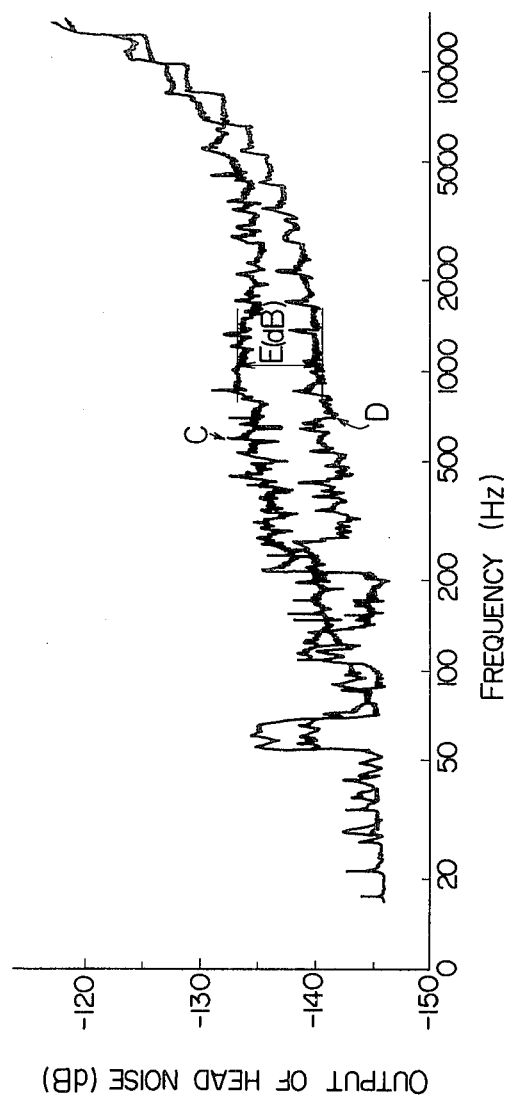
FIG. 3 is a graph showing the results of tests conducted to measure the output of head noise by using a magnetic head for cassette stereo.

Specimen 1 shown in Table 2 or the alloy material of the composition $Co_{79} Cr_{10.6} Zr_{10.4}$ was used for preparing a magnetic head for cassette stereo. Tests were conducted on this head for its sliding noise output property by bringing the head into engagement with a γ-$Fe_2O_3$ tape having no signals recorded thereon. Heads of the same shape were prepared by using ferrite material and Fe-Al-Si alloy material and used as controls. In order to define the term sliding head noise as used in this specification, FIG. 3 shows data obtained on ferrite heads. In FIG. 3, C and D represents an output voltage of the magnetic head obtained with a running tape and an output voltage thereof obtained with no running tape, respectively. The difference between the values of C and D is the sliding head noise output. A comparison of the magnetic head according to the invention with those formed of conventional ferrite material and Fe-Al-Si alloy material with regard to sliding head noise output at a high frequency of 1 KHz at which the sliding head noise output is high shows that the heads tested have the outputs of 0 dB, 7 dB and 3 dB respectively, indicating that the magnetic head according to the invention has a very low sliding head noise output property.

EXAMPLE 3

By selecting specimen 7 shown in Table 2 or the alloy material of the composition $Co_{80} Ni_{10} Zr_{10}$, magnetic head gaps were prepared with different types of shim. Tests were conducted on these magnetic gaps to see how the gaps were deformed. The types of shim prepared for tests include Ti in foil form (hardness, Hv 250), Be-Cu alloy in foil form (hardness, Hv 350), $SiO_2$, glass and amorphous alloy $(Ni_{80} Cr_{20})_{78} Si_{10} B_{12}$. The shim were applied in two processes, one process consisting in forming a gap by inserting a shim in foil form as known in the art and the other process consisting in directly forming a shim of a predetermined thickness on the head core by sputtering. When sputtering was relied on, crystallization of the amorphous alloy occurred as the temperature of the core exceeded the crystallization temperature of the amorphous alloy, thereby spoiling the magnetic properties of the core. When the core was of the type formed by laminating thin sheets of core shape, the adhered layers forming the lamination were loosened and the flattenability of the gap forming surfaces was reduced, making it impossible to form a gap of a predetermined length. To eliminate these defects, a magnetron sputtering device of the known type having a high sputtering rate enabling shim formation to be effected in a short period of time was used in this example. In this case, the core showed a rise of temperature of below 80° C. In determining the gap deformation rate, the following test was conducted. The magnetic head according to the invention was mounted on a cassette type recorder in which a tape having alloy power applied thereto or what is generally referred to as a metal tape was run at the rate of 4.8 cm/sec. The tape was run for 100 hours and the length of the gap was measured before and after the test. The gap deformation rate was obtained by dividing the gap length (μm) following the 100 hour run by the initial gap length (μm). Table 3 shows the results obtained in gap deformation tests. Specimens used in the test as controls include those of the head gap formed by inserting shims in the form of Ti in foil form, Be-Cu alloy in foil form and glass in foil form. It has been found that the shim materials of $SiO_2$, glass and amorphous nonmagnetic alloy according to the invention have a very low gap deformation rate, and that the shim materials of Ti and Be-Cu alloy have a lower gap deformation rate when used by sputtering or vacuum evaporation than when used in foil form and inserted into the gap.

Tests were conducted on the magnetic head according to the invention and the heads of the prior art provided with a shim by sputtering of Ti and in the form of Ti foil used as controls to determine the electromagnetic transducing property of the magnetic heads in the form of a reproducing frequency property (a reproducing output ratio of 14 KHz/315 Hz). All the magnetic heads had a gap length of 1.5 μm, and a metal tape was run for 100 hours while being maintained in contact with the heads. The head according to the invention showed no changes in the initial value of +17.0 dB but the controls showed a drop in the initial value of +17.0 dB to +14.5 dB after the test. Thus, it will be appreciated that the use of a shim, particularly a shim of amorphous material, which is applied to the gap of the head core of amorphous alloy material according to the invention by the vacuum evaporation technique enables the performance of the magnetic head to be stabilized because it is free from gap deformation.

EXAMPLE 4

A magnetic head was prepared by using the same method as described by referring to example 1 from the amorphous alloy material of the composition $Co_{80} Nb_{10} Zr_{10}$. A nonmagnetic alloy consisting of 45 atomic % Co, 35 atomic % Ni and 20 atomic % Cr having a thickness of 1.3 μm was used as shim material in foil form which was inserted into the core and adhesively bonded thereto provide a head gap. This head was subjected to the same gap deformation test as described by referring to Example 3. The result obtained is shown in Table 3. A reproducing frequency property test was conducted on this magnetic head by the same method as described by referring to Example 3. The result of the test shows no deterioration of the head with respect to this property.

The same test was conducted on controls (see Table 3) including magnetic heads using Ti and Be-Cu alloy in foil form. The result shows that the controls had a reduction of −2.5 dB and −3.0 dB respectively. Alloys of the composition containing 30–50 atomic % Co, 16–36 atomic % Ni, 2–22 atomic % Cr and the balance Fe showed the same result as obtained with example 4 when a shim in the form of alloy foil was used. These shims formed of alloys had a Curie point at a temperature below −40° C., were nonmagnetic at room temperature and had a Vickers hardness of about 500.

TABLE 3

| No. | Shim Material | Gap Forming Method | Gap Deformation Rate |
|---|---|---|---|
| Example 3 | | | |
| 1 | SiO₂ | Sputtering | 1.00 |
| 2 | Glass | " | 1.00 |
| 3 | Amorphous-Nonmagnetic Alloy | " | 1.05 |
| 4 | Be—Cu Alloy | " | 1.10 |
| 5 | Ti | " | 1.07 |
| 6 | Ti | Vacuum Evaporation | 1.10 |
| Controls | | | |
| 1 | Ti Foil | Adhesion with Resin | 1.30 |
| 2 | Be—Cu Alloy Foil | Adhesion with Resin | 1.35 |
| 3 | Glass Foil | Adhesion with Resin | 1.30 |
| Example 4 | | | |
| 1 | 45 Co, 35 Ni, 20 Cr* | Adhesion with Resin | 1.10 |

*Atomic percentage.

EXAMPLE 5

A magnetic head core of the laminated sheets was prepared from a thin strip of amorphous alloy of the same composition as described by referring to Example 3. Thin sheets of a predetermined shape were obtained from the strip of 50 μm laminated by using an epoxy resin as an adhesive at 200° C. in one hour. The lamination contained 12 sheets of the predetermined shape. When the lamination was formed, lamellar α-Fe₂O₃ particles of the grain size of 1.0 μm was added to the adhesive in 50 weight % and mixed therewith. The mixture was applied to the thin sheets uniformly while applying pressure thereto, to provide a core of the laminated sheets. The core was used to provide a magnetic head for use with a cassette stereo system. Tests conducted on cores using the addition of the lamellar α-Fe₂O₃ particles to the adhesive and cores having no such addition show that the abrasion loss suffered after the test was run for 1000 hours by the former was ⅓ that suffered by the latter, indicating that the addition of the lamellar α-Fe₂O₃ particles has the effect of greatly improving the wear resistance of the head. In this example, the core had the magnetic alloy ratio of 90%. The same effect was achieved when the minute, lamellar particles of below 3 μm were used. Besides α-Fe₂O₃, BN, CrO₂ and Al₂O₃ may be used as minute, lamellar particles. The use of minute particles of spherical shape or no definite form is not desirable because the magnetic alloy rate of the core is reduced to a level below 90%. In application, magnetic material, such as CrO₂, is preferably applied while a magnetic field is being applied to the core because this enables uniform application to be achieved.

EXAMPLE 6

The core of the laminated sheets produced in example 5 had its permeability reduced from 12000 before lamination to 4000 after lamination due to heat treatment to which the core was subjected in lamination. This greatly reduced the properties of the magnetic head. However, by holding the core for over 10 minutes at a temperature equal to or higher than the temperature (200° C.) at which lamination was carried out while applying to the core thicknesswise thereof an external magnetic field (800 Oe) of a magnitude high enough to substantially cause magnetic saturation thereto or by subjecting the core to heat treatment while being held in a vertical magnetic field, it was possible to restore the permeability of the core to a level substantially equal to its initial level. Usually, since lamination of the core sheets is carried out in a temperature range between 100° and 250° C., the aforesaid head treatment was also carried out in this temperature range. This heat treatment may be carried out in the lamination step by applying an external magnetic field to the core sheets. When this is the case, no great reduction in permeability occurred as is the case when lamination was carried out without applying an external magnetic field. Tests show that a cassette stereo head using a core subjected to heat treatment in a magnetic field had a reproducing sensitivity of −75 dB when used for reproducing a tape of a magnetic level of 250 nwb/m while a cassette stereo head using a core subjected to heat treatment without application of an external magnetic field had a reproducing sensitivity of −70 dB, showing that the application of the magnetic field results in an improvement to the extent of about 5 dB.

Depending on composition, an amorphous alloy may have its crystallization temperature Tx and its Curie point temperature Tc related such that Tc>Tx. When such amorphous alloy material is used for producing a core, it is possible to impart thereto an initial permeability of over 10000 and a high saturation magnetic flux density by applying to the surface of the core an external rotary magnetic field of intensity high enough to cause magnetic saturation in the surface of the core while subjecting the core to heat treatment or by subjecting the core to heat treatment in a rotary magnetic field, after the core is subjected to heat treatment while holding same in a vertical magnetic field as described hereinabove. For example, the amorphous alloy material of the composition Co₈₀ Ni₁₀ Zr₁₀ can be formed into a core with $B_s$=11000 G and $\mu_0$>10000 by this process.

From the foregoing description, it will be appreciated that according to the invention, it is possible sible to provide a magnetic head of higher magnetic saturation, higher wear resistance and lower output of sliding head noise than alloy heads of the prior art by using amorphous alloy material of specific composition. The invention provides a method suitable for producing such magnetic head with ease.

What is claimed is:

1. A magnetic head comprising a head core essentially formed of metallic magnetic material adapted to be positioned against and brought into contact with a recording medium, said head core being formed with a head gap in a portion thereof positioned against the recording medium and having windings mounted thereon, said metallic magnetic material being essentially amorphous and having the following composition: $(Co_{1-x}M'_x)_a Zr_b Si_c B_d$, where M' is at least one element selected from the group consisting of Cr, Mn, Fe, Ni, Nb, Mo, W and Ti, $0.03 \leq x \leq 0.15$, $3 \leq b \leq 25$, $0 \leq c \leq 20$, $0 \leq d \leq 5$, and $a+b+c+d=100$.

2. A magnetic head as claimed in claim 1, wherein said head gap of said head core is formed by using gap shim material in the form of amorphous metal or oxide.

3. A magnetic head as claimed in claim 1, wherein said head gap of said head core is formed by using metallic shim material of the composition consisting of 30-50 atomic % Co, 16-36 atomic % Ni, 2-22 atomic % Cr and the balance Fe.

4. A magnetic head as claimed in claim 1, wherein said head core has a construction comprising thin sheets of metallic magnetic mateial of a predetermined shape bonded together with a resin to form a lamination, said resin containing minute, lamellar particles of high hardness.

5. A magnetic head as claimed in claim 4, wherein said minute, lamellar particles are any one of $\alpha$-$Fe_2O_3$, $CrO_2$, BN and $Al_2O_3$.

6. A magnetic head as claimed in claim 1, wherein said gap shim material is in the form of a coat applied by vacuum evaporation of amorphous metal or oxide.

7. A method of production of a magnetic head comprising the steps of:
preparing a plurality of thin sheets of a predetermined shape formed of amorphous metal material of the composition $(Co_{1-x}M'_x)_a Zr_b Si_c B_d$, where M' is at least one element selected from the group consisting of Cr, Mn, Fe, Ni, Nb, Mo, W and Ti, $0.03 \leq x \leq 0.15$, $3 \leq b \leq 25$, $0 \leq c \leq 20$, $0 \leq d \leq 5$, and $a+b+c+d=100$; and
bonding said thin sheets together to form a lamination by using a resin in a magnetic field to provide a head core.

8. A method of production of a magnetic head comprising the steps of:
preparing a plurality of thin sheets of a predetermined shape formed of amorphous material of the composition $(Co_{1-x}M'_x)_a Zr_b Si_c B_d$, where M' is at least one element selected from the group consisting of Cr, Mn, Fe, Ni, Nb, Mo, W and Ti, $0.03 \leq x \leq 0.15$, $3 \leq b \leq 25$, $0 \leq c \leq 20$, $0 \leq d \leq 5$, and $a+b+c+d=100$;
bonding said thin sheets together to form a lamination by using a resin to provide a head core; and
subjecting said head core to heat treatment in a magnetic field.

* * * * *